United States Patent [19]
Gay et al.

[11] 3,884,715
[45] May 20, 1975

[54] SECONDARY ELECTROCHEMICAL POWER-PRODUCING CELLS HAVING MIXED CATHODE COMPOSITION

[75] Inventors: Eddie C. Gay, Park Forest; Hiroshi Shimotake, Hinsdale, both of Ill.; Elton J. Cairns, Troy, Mich.; William J. Walsh, Naperville, Ill.

[73] Assignee: The United States of America as represented by the Energy Research and Development Administration, Washington, D.C.

[22] Filed: Sept. 28, 1973

[21] Appl. No.: 401,729

Related U.S. Application Data

[63] Continuation of Ser. No. 228,619, Feb. 23, 1972, abandoned.

[52] U.S. Cl. .............................. 136/6 F; 136/137
[51] Int. Cl. .................. H01m 35/02; H01m 43/00
[58] Field of Search....... 136/83 R, 83 T, 6 L, 6 LF, 136/6 F, 6 FS, 6 LN, 100, 137, 154–155, 20, 6 R

[56] References Cited
UNITED STATES PATENTS

| | | | |
|---|---|---|---|
| 3,121,028 | 2/1964 | Story | 136/6 L |
| 3,488,221 | 1/1970 | Shimotake et al. | 136/20 |
| 3,578,500 | 5/1971 | Maricle et al. | 136/6 LN |
| 3,679,480 | 7/1972 | Brown et al. | 136/83 T |
| 3,679,484 | 7/1972 | Dey et al. | 136/83 R |

Primary Examiner—Anthony Skapars
Attorney, Agent, or Firm—Dean E. Carlson; Arthur A. Churm; Hugh W. Glenn

[57] ABSTRACT

A secondary electrochemical power-producing cell including an anode containing a molten alkali metal of low electronegativity, an electrolyte containing alkalimetal ions and a cathode containing a mixture of a chalcogen and a component which reduces the activity of said chalcogen in the electrolyte, thereby inhibiting transfer of the chalcogen from the cathode to the anode and increasing the cell life.

2 Claims, 4 Drawing Figures

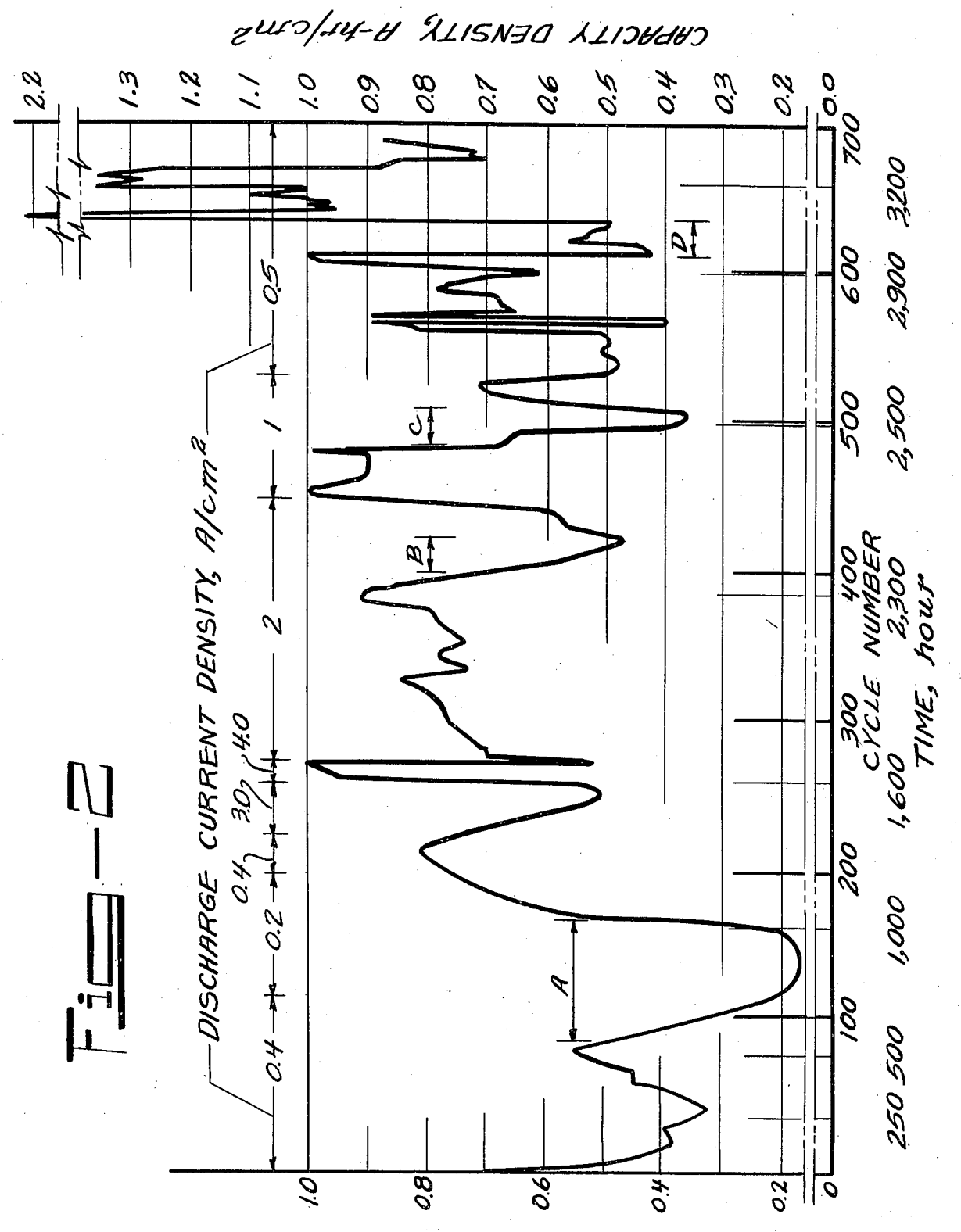

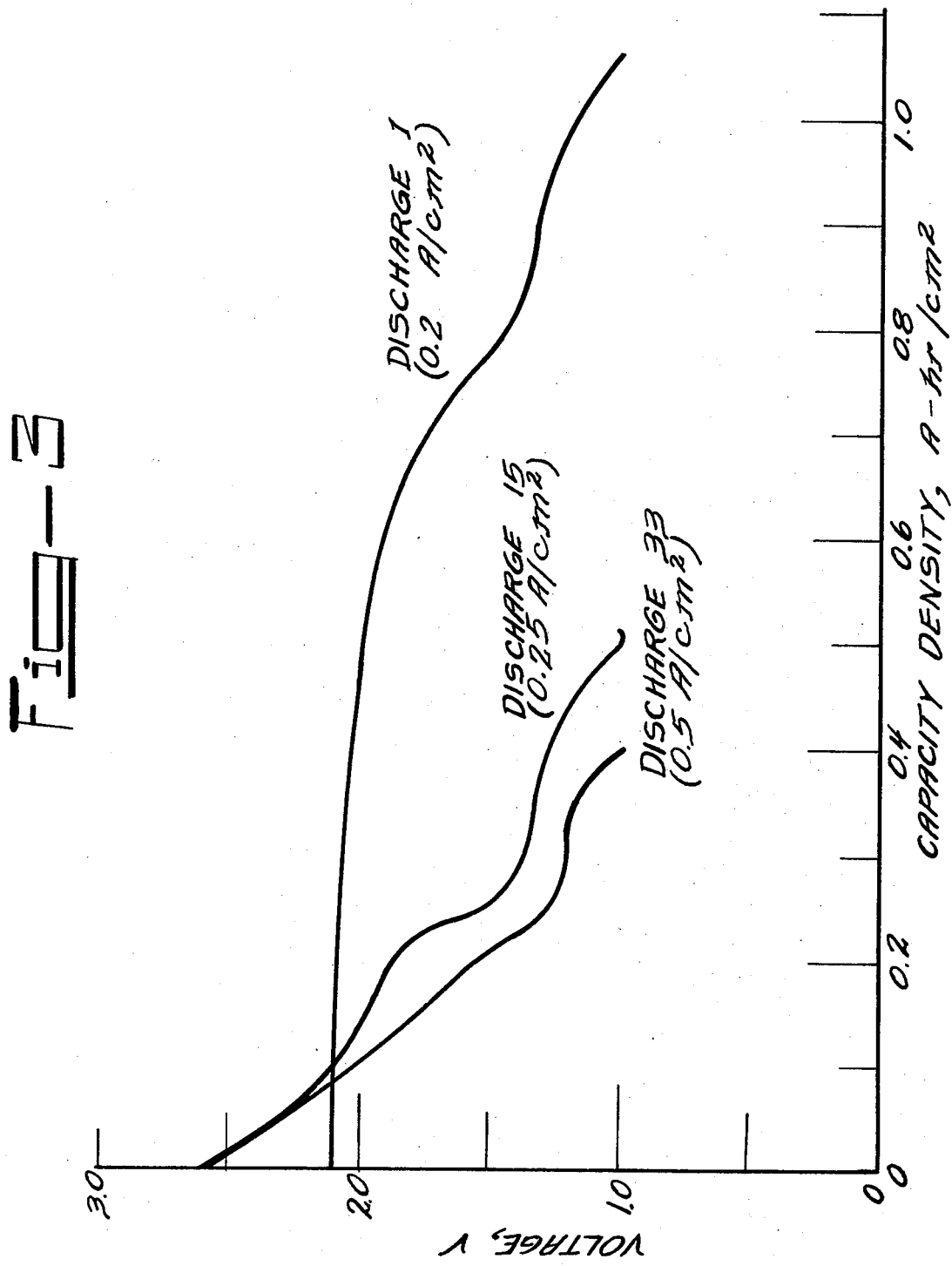

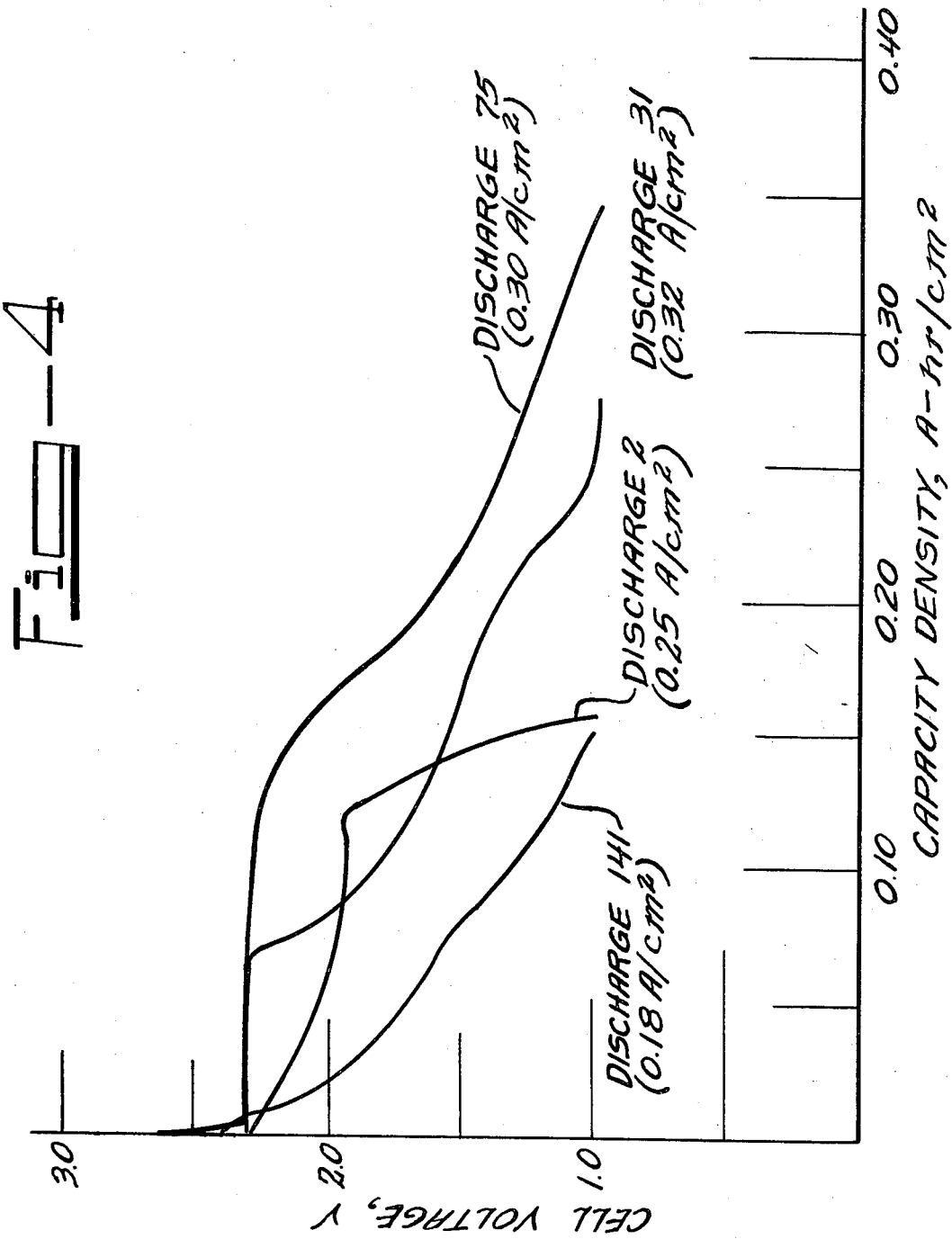

SECONDARY ELECTROCHEMICAL POWER-PRODUCING CELLS HAVING MIXED CATHODE COMPOSITION

CONTRACTUAL ORIGIN OF THE INVENTION

The invention described herein was made in the course of, or under, a contract with the UNITED STATES ATOMIC ENERGY COMMISSION.

CROSS REFERENCE TO RELATED APPLICATION

This is a continuing application of the assignee's co-pending application Ser. No. 228,619 (70), filed Feb. 23, 1972, now abandoned.

BACKGROUND OF THE INVENTION

This invention relates to electrochemical power-producing cells and more particularly to alkali-metal chalcogen secondary cells having high specific energies and long lifetimes. In more detail, the invention relates to a novel cathode composition for an elecrochemical, power-producing cell.

Although a wide variety of electrochemical cells is available, none presently in existence can be utilized for applications requiring a high specific energy (near 200 watt-hours per kilogram, W-hr/kg) and a long cycle life (a large number of charge/discharge cycles before failure, e.g. 2,000 cycles). Certain of these applications presently being investigated include auxiliary power sources for military hybrid vehicles, battery power sources for electrically powered commercial vehicles and implantable batteries serving as power sources for artificial hearts. Each such application has its own particucular requirements in addition to a high specific energy and long cycle life. For example, a hybrid military vehicle requires a high specific power (over 200 W/kg) and a short-time peak power density of 1 to 3 $W/cm^2$ (watts per $cm^2$ of cathode surface area projected upon the anode) for acceleration and hill climbing. On the other hand, while an implantable battery does not require a particularly high power output or specific power, it does require a very long cycle life (thousands of cycles) as well as a high energy density (at least 0.6 watt-hours per $cm^2$, $W-hr/cm^2$) and it must be lightweight and quite compact.

The characteristics that primarily affect the specific energy and power are electronegativity and equivalent weight. Electronegativity is a measure of an elemnet's power to attract negative charges or electrons. This concept was formulated by Pauling, Journal of the American Chemical Society, 54, 3570, 1932; *The Nature of the Chemical Bond*, Cornell University Press, Ithaca, 1960. The elements having the lowest electronegativity are those of Groups IA and IIA of the Periodic Table, that is, the alkali and alkaline earth metals; their low electronegativity makes them most suitable for use as anode materials because they surrender their electrons more easily than other elements. Conversely, the elements with the highest electronegativity are most suitable as cathode materials because they have the greatest affinity for electrons; these elements are found in Groups VIA and VIIA, the chalcogens and halogens. The large difference of electronegativities between anode and cathode materials provides a relatively large cell voltage (in the range of 2-4 volts). Selection of the anode (Groups IA and IIA) and cathode (Groups VIA and VIIA) materials from those elements of lowest equivalent weight (those high up on the Periodic Table) yields the lightest-weight combination of reactants, corresponding to a high specific energy.

The only class of cells which shows promise for development into electrochemical cells useful in such applications consists of secondary cells that operate at elevated temperatures. These cells employ molten alkali-metal anodes such as lithium or sodium (of low electronegativity), molten-salt or cation-conducting solid electrolytes, and cathode materials of Groups VIA and VIIA of the Periodic Chart, the chalcogens and halogens (of high electronegativity). Of this class of cells, the alkali-metal/chalcogen cell having a molten-salt or paste electrolyte containing alkali-metal ions has proven to be very promising.

The performance of such alkali-metal (sodium or lithium)/ chalcogen cells is dependent upon a large number of factors and variables. One very important variable is the particular cathode material which is utilized. A substantial amount of work has been performed on such cells utilizing the chalcogens selenium or sulfur as the cathode reactant, and while these cathode materials have resulted in encouraging cell performances, secondary cells utilizing selenium or sulfur alone are still inadequate for some specific practical applications. Other cathode reactants such as arsenic, thallium, lead and aluminum have been suggested (see U.S. Pat. No. 3,488,221 to Hiroshi Shimotake et al., Jan. 6, 1970, assigned to U.S. Atomic Energy Commission) however; these materials are of lower electronegativity and higher equivalent weight than the above chalcogens, thus resulting in cells of reduced voltage and specific energy and power when employed alone or in combination with sulfur or selenium. To achieve practical applications, electrochemical cells should produce a specific energy greater than 200 watt-hours per kilogram and a capacity density greater than 0.3 A-$hr/cm^2$ (ampere-hours per $cm^2$) at a current density of 0.3 $A/cm^2$ (amperes per $cm^2$) or greater with a cycle life approaching 300 cycles.

One problem has been a limited cell lifetime resulting from the transfer of selenium or sulfur, e.g. as a result of vaporization, from the cathode to the anode. This gradual transference causes short circuits or loss of capacity to occur in the cell, and reduces the cell performance and eventually causes the cell to fail completely. Prior to the present invention, this problem of cathode material transfer remained unsolved and severely hampered the complete development of alkali-metal/ selenium and alkali-metal /sulfur cells into practical, useful secondary electrochemical power sources.

We have discovered, however, that by mixing certain additive elements of lower electronegativity and higher atomic weight with the selenium or sulfur, this transfer mechanism is suppressed, and not only is the cell lifetime greatly increased, but over-all cell performance in terms of high capacity densities at high current densities is significantly enhanced. While the exact reason for this effect has not been specifically proven, it is believed that these additives reduce the activity of the chalcogen in the electrolyte and the vapor pressure of the chalcogen to thereby inhibit its transfer to the anode. In view of the suppressed activity and since these additives are of lower electronegativity and higher equivalent weight than sulfur or selenium, it is of utmost importance that only a minimum concentration be incorporated into the cathode to preserve cell voltage and specific energy. Although the cell require- 3,884,715 ments for different applications will vary as previously discussed, the long lifetimes and superior cell performances resulting from the present invention would make this invention desirable for use in many of such applications.

Therefore, it is an object of the present invention to provide novel cathode compositions to be utilized in alkali-metal/chalcogen electrochemical cells.

It is another object of this invention to provide cathode additives for alkali-metal/chalcogen secondary cells which will substantially suppress the transfer of the chalcogen from the cathode to the anode.

It is a further object to provide cathode additives which have lower electronegativity and higher equivalent weight and the chalcogen within the cathode at minimum critical concentrations to essentially eliminate chalcogen transfer from the cathode while maintaining effective cell voltage and specific energy.

It is also an object to provide a method of essentially eliminating chalcogen transfer from cathode to anode within a secondary electrochemical cell without incurring substantial reductions in cell voltage and specific energy.

Further objects and advantages of the invention will be apparent from the following detailed description of the invention.

SUMMARY OF THE INVENTION

During the course of investigating alkali-metal/selenium and alkali-metal/sulfur secondary cells, we found that the transfer mechanism which causes the selenium or sulfur to move from the cathode to the anode can be substantially suppressed by combining one or more of certain additives of lower electronegativity than selenium or sulfur. By mixing thallium with the selenium or by mixing selenium, thallium, arsenic or mixtures of selenium and thallium, lead, arsenic or aluminum with the sulfur, the activity of the selenium or sulfur in the electrolyte and the vapor pressure of these chalcogens are greatly reduced, resulting thereby in essentially eliminating any transfer of selenium or sulfur to the anode. The critical concentrations below which this transfer is not eliminated and above which unnecessary reductions in specific energy and cell voltage result are presented for various additives. Capacity densities of 0.5 A-hr/cm$^2$ above a 1-volt cutoff at current densities of 0.30 A/cm$^2$ have been obtained over an extended period of time with cell lifetimes exceeding 2000 cycles and 4000 hours of continuous operation.

BRIEF DESCRIPTION OF THE DRAWINGS

FIG. 2 is a graph showing the capacity density vs. operating time and cycle number for a cell having a cathode composition of 92 a/o sulfur — 5.7 a/o selenium — 2.3 a/o thallium.

FIG. 3 is a graph showing the voltage vs. capacity density characteristics for a cell having a cathode composition of 92 a/o sulfur — 5.7 a/o selenium — 2.3 a/o lead.

FIG. 4 is a graph showing the voltage vs. capacity density characteristics for a cell having a cathode composition of 92 a/o sulfur — 5.7 a/o selenium — 2.3 a/o aluminum.

DETAILED DESCRIPTION OF THE INVENTION

Figure 1:
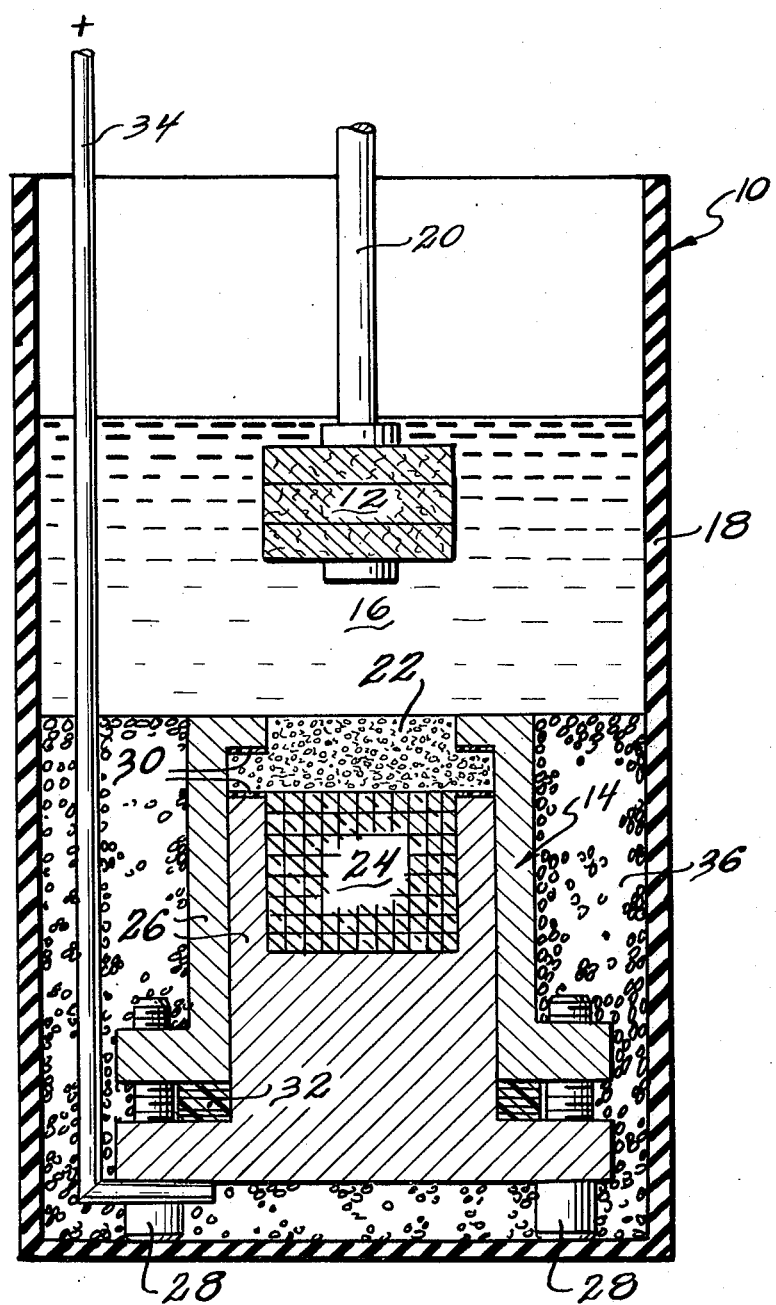
FIG. 1 is a schematic view of a cell used experimentally to prove operability of the present invention.

Referring first to FIG. 1, secondary cell 10 comprises an anode 12 and a cathode assembly 14 separated by moltensalt electrolyte 16 and disposed within alumina crucible 18. Anode 12 was constructed from porous nickel (80% porosisty, 60 μm pore size) and impregnated with lithium. Attached to anode 12 is an insulated electrical lead 20. Cathode assembly 14 includes a porous molybdenum (78% porosity, 20 μm pore size) sheath 22 which is impregnated with the electrolyte and a porous graphite (48% porosity, 120 μm pore size) disk 24 which is impregnated with the cathode mixture, the present invention. These are secured sithin molybdenum housing 26 by molybdenum bolts 28. Gaskets 30 and stacked gaskets 32 prevent the escape of the cathode material from housing 26, thereby insuring that the electrolyte can contact the cathode material only by passing through the pores of porous sheath 22. A thin sheet of flexible and compressible graphite is an excellent material for gaskets 30 and 32, one particular type of such material being termed Grafoil, a trade name material. An insulated electrical lead 34 is attached to housing 26, and alumina pellets 36 fill the annular space between housing 26 and alumina crucible 18 to just below the level of sheath 22's upper surface. This was done merely as an experimental convenience to reduce the amount of electrolyte 16 required to fill the cell.

In practice, any cell design may be utilized with the present invention, cell 10 merely representing an example of the type of cell utilized experimentally to test and prove the operability of the invention. Structural materials for anode 12 and cathode 14 can be selected from any number of a wide variety of conventional materials known in the art. There are also a large number of electrolytes containing alkali-metal ions in both molten and ceramic paste disk form known to the art and from which electrolyte 16 can be selected. While lithium was utilized in the present experimental work as the anode reactant material, sodium can also be used with the present invention due to sodium's low electronegativity, low equivalent weight and known operability with sulfur or selenium in a secondary electrochemical cell.

In addition, cell 10 remained unsealed for experimental convenience in examining the cell after testing. Because the experimental cells were unsealed, they were tested in glove-boxes containing a high-purity (<2 ppm each of O$_2$ and N$_2$; <1 ppm H$_2$O) helium atmosphere, thereby simulating a sealed condition. Therefore, the present invention is applicable to sealed as well as unsealed alkali-metal/chalcogen secondary cells.

As previously stated, a substantial amount of work has been performed with cells utilizing selenium or sulfur as the cathode material. The selenium cells generally produced capacity densities of 0.3 to 0.4 A-hr/cm$^2$ above 1 volt at current densities of around 0.3 A/cm$^2$. Their lifetimes, though, were limited to about 100 hours and 40 cycles or less. The sulfur cells, on the other hand, generally had lifetimes of around 1000 hours and 400 cycles, utilizing an enclosed cathode configuration similar to that of FIG. 1. However, they were only able to produce capacity densities of about 0.2 A-hr/cm$^2$ above 1 volt at current densities of around 0.2 A/cm$^2$. It is believed that one of the primary causes of failure and poor performance of these cells having a single chalcogen as a cathode reactant is the high loss rate of sulfur or selenium from the cathode at the elevated operating temperatures.

Utilizing cell configurations similar to that of FIG. 1, a series of lithium/selenium and lithium/sulfur cells were operated mixing various types and percentages of additives in with the selenium and sulfur in hopes to obtain both good performances and long lifetimes. Due to the great number of cells tested, the results for only a representative portion of the tested cells are discussed.

Ordinarily, the addition of such elements as thallium, arsenic, lead or aluminum to a sulfur or selenium cathode material would be considered undesirable, as it would decrease the specific energy of the cell. This is due to these elements being of lower electronegativity and greater equivalent weight than the chalcogens. Values of electronegativity as given by Pauling (cited above) are as follows: S — 2.5, Se — 2.4, As—2.0, Tl — 1.8, Pb — 1.8 and Al — 1.5. As previously mentioned, the elements with lower values have a decreased affinity for electrons and in this respect are less suitable as cathode materials. However, the inventors have found that the addition of a critical concentration of one or more of these additive elements to a chalcogen cathode material can extend the cell life by reducing the activity and the loss of chalcogen from the cathode. As a result of the low electronegativity and high equivalent weight of these additives in respect to the chalcogen, it is critical that only minimum concentrations be employed.

Lithium/selenium cells having thallium as a cathode component indicated that the transfer of selenium from the cathode to the anode was substantially inhibited by the presence of the thallium, and while these cells did not exhibit the high capacity densities and lifetimes expected, these lower performances were not the result of the cathode mixture but of other factors which will be described.

One cell included 32.2 grams of a 70 a/o selenium — 30 a/o thallium cathode mixture and 8.2 grams of lithium in an anode. The anode area was 23 cm² and the cathode had an area of 45 cm² with an interelectrode distance of 0.64 cm. Molten LiF-LiCl-KCl eutectic was the electrolyte, and the cell had a theoretical capacity density of 0.23 A-hr/cm². With the operating temperature being about 410°–415°C., this cell achieved a capacity density of 0.26 A-hr/cm² above 1 volt at a current density of 0.15 A/cm². The cell operated for 380 hours and 71 cycles before failure. The cause for failure was due to electrical shorting resulting from electrolyte creepage out of the unsealed cell and subsequent lithium contact from anode to cathode. No significant amounts of selenium or thallium were found at the lithium anode.

An attempt was then made to determine the minimum amount of thallium required to inhibit the transfer of selenium from cathode to anode in order to maximize the amount of selenium in the cell as well as reduce the cathode weight resulting from thallium's high atomic weight. Electrochemical cells employing 98 a/o selenium — 2 a/o thallium composition as cathodes were operated and although this concentration of thallium was sufficient to suppress the selenium transfer mechanism, some selenium was found to have deposited on the anode. Two cells were employed, each including about 0.5 gram of the selenium-thallium mixture in cathodes having areas of 2.6 and 3.8 cm² each formed in a 2.2 cm diameter by 1.9 cm high crucible. The anodes each contained about 0.2 gram of lithium within a porous stainless steel matrix having areas of 1.3 and 2.4 cm². Several anodes were used in each cell at varying residence times and the weight of selenium transferred to the anode determined in each case. The results are given below in Table I.

TABLE I

| Anode No. | Se on Anode (mg) | Anode Residence Time (hr) |
|---|---|---|
| Cell I — Typical Current Density 0.02 A/cm² | | |
| 1 | 96 | 27.6 |
| 2 | 236 | 17.8 |
| 3 | 266 | 25.2 |
| 4 | 160 | 4.2 |
| 5 | 89 | 2.5 |
| Cell II — Typical Current Density 0.11 A/cm² | | |
| 1 | 89 | 29 |
| 2 | 168 | 56 ± 8 |

It can be seen from the above Table that small and, in some instances, substantial amounts of selenium were deposited onto the anodes used in these cells. From these results it is concluded that the minimum and the critical concentration of thallium in selenium needed to suppress the chalcogen transfer mechanism is 2 a/o.

Sulphur/lithium cells were tested with arsenic as the cathode additive. The results show that the addition of a minimum concentration of arsenic effectively inhibit the loss of sulfur from the cathode. The first cell included 14.1 grams of active cathode composition of 90 a/o sulfur and 10 a/o arsenic along with 2.5 grams of carbon black. The mixture was formed into a 5.1 cm diameter disk within a cathode cup having a niobium current collector. The porous graphite sheath over the cathode included a small opening at the top to allow the escape of gases during startup. Two layers of porous zirconia cloth were placed atop the sheath to minimize loss of sulfur particles entrained with gases leaving the electrode during startup and initial operation of the cell. The anode contained 4.15 grams of lithium within a porous nickel matrix.

In order to detect sulfur vapor lost during operation of the cell, an inverted stainless steel beaker maintained at about 100° to 120°C. was positioned above the cell. The cell was initially operated at 400°C. for 64 hours without an anode present. No sulfur was detected on the inside of the beaker after that period. The lithium electrode was then assembled into the cell which was operated through 38 cycles for a period of 101 hours when the feedthrough protecting one of the electrical terminals made the cell inoperable. The cell performance was very stable throughout the 101 hours of operation and the performance data are summarized in Table II below.

TABLE II

| | Li/LiF-LiCl-KCl/S-As-C Cell | | |
|---|---|---|---|
| Cycle | Current Density A/cm² | Capacity Density A-hr/cm² | Charge Voltage Cutoff |
| 3 | 0.1 | 0.3 | 2.9 |
| 10 | 0.2 | 0.1 | 2.9 |

TABLE II-Continued

Li/LiF-LiCl-KCl/S-As-C Cell

| Cycle | Current Density A/cm² | Capacity Density A-hr/cm² | Charge Voltage Cutoff |
|---|---|---|---|
| 20 | 0.2 | 0.27 | 3.3 |
| 30 | 0.2 | 0.27 | 3.3 |

Theoretical Capacity Density — 0.86 A-hr/cm²
Temperature — 400-450°C.
Discharge Cutoff — 1 volt
Electrode Areas: Anode — 32 cm², Cathode — 22 cm²

During the operation of the cell, the inverted beaker was periodically removed and inspected. No sulfur was detected in the beaker until after about 50 hours of cycling, when a slight yellow coloration appeared. The total amount of sulfur lost from the cell during the 64 hours of preheat and 101 hours of cycling was estimated to be less than 0.01 gram. From these results it is concluded that 10 a/o arsenic within aa cathode mixture is effective in reducing vaporization losses of sulfur.

Another cell was similarly operated but with only 4.9 a/o arsenic within a sulfur cathode. After 120 hours of operation, the specific capacity of the cell had dropped to less tha 0.05 amp-hr/cm² at a current density of 0.10 amp/cm. On opening the sulfur electrode compartment, it was discovered that most of the sulfur originally charged in the cell had been lost. It was thus seen that 5 a/o arsenic within a sulfur cathode was insufficient to prevent sulfur loss. On considering the results obtained from both of these cells, it was concluded that a minimum critical concentration of arsenic within a sulfur cathode was about 10 a/o.

Other lithium/sulfur cells were also operated using thallium as an additive blended within the sulfur cathode. These cells indicated that the thallium component also inhibited the transfer of sulfur to the anode. However, at cell operating temperatures of around 400°C., the sulfur/thallium system is composed of two immiscible liquids. One of the liquids included about 0.1 a/o thallium which was found to be an insufficient level of additive to inhibit sulfur loss. The other liquid included a substantially higher thallium concentration. To confirm that thallium would inhibit sulfur transfer, a cell comprising a cathode with 33⅓1/3 a/o thallium and 66.7 a/o sulfur was operated with a paste disk electrolyte and a lithium anode. The cell operated for about 30 hours and 3 cycles before it was shut down due to cracking of the paste disk electrolyte. During this period no significant amounts of sulfur or thallium had transferred to the anode.

Several cells were next tested that included sulfur/selenium compositions as cathode material. Cathodes composed of 50 a/o sulfur and 50 a/o selenium as well as 94.2 a/o sulfur and 5.8 a/o selenium were employed in these tests. The results were exceptionally good, with the 50 a/o selenium cathode operating for over 4000 hours and 2000 cycles and one of the 5.8 a/o selenium cells operating for more than 1000 hours and 500 cycles. In both of these tests, no significant transfer of sulfur or selenium to the anode was detected. At first this seems to be somewhat inconsistent with the fact that both selenium and sulfur when used separately as cathode material are transferred from the cathode to the anode. However, when they are mixed together and the mixture is used as a cathode reactant material, a synergistic effect occurs, whereby each substance inhibits the transfer of the other to the anode in addition to acting as a cathode reactant.

Due to the results of the above tests other than those involving arsenic which were performed later, a series of lithium/sulfur cells were then tested, utilizing a mixture of both selenium and thallium with sulfur, since both had functioned quite well as individual components for inhibiting the transfer of the chalcogen. One cell having the cathode mixture of 92 a/o sulfur — 5.7 a/o selenium — 2.3 a/o thallium was tested. 1.74 grams of this mixture were utilized in the cell along with 0.4 gram of lithium. Both anode and cathode areas were 2 cm² each, and the interelectrode distance was 1 cm, the electrolyte being molten LiF-LiCl-KCl eutectic salt. The cell was operated at about 380°C. and had a theoretical capacity density of 1.46 A-hr/cm². The capacity density has been almost consistently above 0.4 A-hr/cm² with current densities ranging from 0.2 to 4.0 A/cm². This cell operated continuously for over 4000 hours and more than 800 cycles. FIG. 2 shows this cell's performance during the first 3400 hours of operation. The decrease in the capacity density at point A on the graph was due to air contamination of the helium glovebox. The air caused malfunctioning of the anode by forming a lithium oxide film on the anode surface. Upon correction of this condition, the capacity density increased as indicated. The decreases in the capacity density indicated at points B, C and D on the graph were caused by temporary shorts. Other smaller fluctuations in the capacity density were due to various tests performed with the cell during its operation. Throughout the operation of this cell, the sulfur and selenium have been retained in the cathode with no noticeable transfer occurring to the lithium anode. This cell substantially exceeds the performance requirements for practical applications such as electric vehicle batteries and auxiliary power sources for military hybrid vehicles.

In view of the excellent performance of the above lithium/ sulfur-selenium-thallium cells, additional cells were tested to investigate the effect of other components in place of the thallium. Because lead is less toxic, less costly and more abundant than thallium and its atomic weight is only slightly greater than that of thallium, a cell containing 2.04 grams of a 92 a/o sulfur — 5.7 a/o selenium — 2.3 a/o lead mixture and 0.7 gram of lithium was operated at a temperature of about 380°C. Both anode and cathode areas were 2 cm² each, and the interelectrode distance was 1 cm. A molten LiF-LiCl-KCl eutectic-salt electrolyte was utilized, and the cell had a theoretical capacity density of 1.31 A-hr/cm². FIG. 3 shows the capacity densities obtained for several of the discharges of this cell. The performance of this cell was very good with discharges averaging 0.4 A-hr/cm² capacity density above 1 volt at current densities up to 0.5 A/cm². The cell was operated for 160 hours and 33 cycles before termination due to a loss of electrolyte from the unsealed cell. Transfer of significant amounts of sulfur or selenium to the anode did not occur.

Another cell utilized a cathode mixture of 92 a/o sulfur — 5.7 a/o selenium — 2.3 a/o aluminum. 0.99 gram of this composition and 0.7 gram of lithium were placed in a cell having the molten LiF-LiCl-KCl electrolyte. Both anode and cathode areas were 2 cm² each, and the interelectrode distance was 1 cm. The cell was operated at about 300°C. and had a theoretical capacity density of 0.71 A/hr/cm². FIG. 4 indicates the capacity densities achieved during several of this cell's discharges. The best performance obtained was 0.33 A-hr/cm² capacity density above 1 volt at a current density of 0.32 A/cm². The cell operated for 790 hours and 362 cycles. While the performance of this cell varied somewhat, as indicated by discharge No. 141 in FIG. 4, and finally deteriorated to where termination of the cell operation was required, this was the result of a loss of the molybdenum sheath's mechanical integrity. However, there was no significant transfer of either sulfur or selenium to the lithium anode.

Other substances which have not yet been tested but would probably have the same effect as the thallium in the lithium/selenium cells are zinc, cadmium, phosphorus, iron and antimony. Other inhibitors, based on the performance of the above-described mixtures, for lithium/sulfur cells would include phosphorus as well as mixtures of selenium and numerous other elements such as bismuth, tin, cadmium and indium.

The over-all performances of the described cells varied considerably. However, all the cells indicated that the presence of the described inhibitors with the chalcogen being utilized resulted in the suppression of chalcogen transfer from cathode to anode. While the precise reason for this suppression is not yet known, it is believed that the thermodynamic activity of the chalcogen is reduced by the presence of these inhibitors, therby reducing the chalcogen's activity in the electrolyte. This reduced activity of the chalcogen results in substantially inhibiting its transfer through the electrolyte to the anode.

Since the additives thallium, arsenic, aluminum, and lead are of substantially greater equivalent weight and considerably lower electronegativity than the chalcogens, it is imperative that their concentrations be held to critical minimums. These critical concentrations have been found to be about 10 a/o for arsenic in sulfur and about 2 a/o for thallium in selenium. In view of these results, compositions of lead and aluminum much below those tested, e.g., about 2 a/o, would not reasonably be expected to suppress chalcogen loss.

It is clear from the above series of cells that alkali-metal/chalcogen electrochemical cells containing cathode mixtures of a chalcogen and the described inhibitors can be operated for extended periods of time due to the inhibition of chalcogen transfer to the cell's anode. Capacity densitites of 0.4 A-hr/cm² and higher at current densities of 0.4 A/cm² were frequently achieved throughout these long lifetimes. Such cathode mixtures in alkali-metal/chalcogen electrochemical cells would substantially meet the performance requirements for practical cell applications such as batteries for electric vehicles, implantable batteries and military hybrid vehicle auxiliary power sources.

It will be understood that the invention is not to be limited to the details given herein but that it may be modified within the scope of the appended claims.

The embodiments of the invention in which an exclusive property or privilege is claimed are defined as follows:

1. In a high-temperature, secondary electrochemical cell comprising an anode containing an alkali metal, an electrolyte containing ions of said metal and a cathode containing sulfur, the improvement wherein said cathode includes about 10 atom percent arsenic in a sulfur-arsenic mixture to inhibit loss of said sulfur from said cathode.

2. In a high temperature, secondary electrochemical cell comprising an anode containing an alkali metal, an electrolyte containing ions of said metal and a cathode containing selenium, the improvement wherein said cathode includes about 2 atom percent thallium in a selenium-thallium mixture to suppress the transfer of said selenium from said cathode to said anode.

* * * * *